United States Patent
Narasimha et al.

(10) Patent No.: US 10,542,464 B2
(45) Date of Patent: Jan. 21, 2020

(54) METHODS FOR DATA COMMUNICATION TO A PLATOON OF CONNECTED VEHICLES

(71) Applicant: Futurewei Technologies, Inc., Plano, TX (US)

(72) Inventors: Murali Narasimha, Vernon Hills, IL (US); Philippe Sartori, Plainfield, IL (US); Vipul Desai, Palatine, IL (US); Weimin Xiao, Hoffman Estates, IL (US); Mazin Ali Al-Shalash, Frisco, TX (US); Anthony C.K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/461,088

(22) Filed: Mar. 16, 2017

(65) Prior Publication Data
US 2017/0289864 A1   Oct. 5, 2017

Related U.S. Application Data

(60) Provisional application No. 62/317,242, filed on Apr. 1, 2016.

(51) Int. Cl.
*H04W 36/00* (2009.01)
*H04W 36/08* (2009.01)
(Continued)

(52) U.S. Cl.
CPC ... *H04W 36/0027* (2013.01); *H04W 36/0009* (2018.08); *H04W 36/08* (2013.01); *H04W 36/32* (2013.01); *H04W 36/36* (2013.01)

(58) Field of Classification Search
CPC ..... H04W 36/30; H04W 36/32; H04W 36/18; H04W 36/04; H04W 16/14
(Continued)

(56) References Cited

U.S. PATENT DOCUMENTS

| | | | |
|---|---|---|---|
| 2012/0129528 A1 | 5/2012 | Kobayashi | |
| 2012/0147773 A1* | 6/2012 | Kim | H04L 1/0025 370/252 |

(Continued)

FOREIGN PATENT DOCUMENTS

| | | |
|---|---|---|
| CN | 101754291 A | 6/2010 |
| CN | 103546930 A | 1/2014 |

(Continued)

OTHER PUBLICATIONS

Tannert, Chuck, "Self-Driving Cars: A Crash Course in Communication," fastcompany.com, http://www.fastcompany.com/3024360/tech-forecast/driverless-cars-a-crash-course-in-communication, retrieved Jun. 22, 2017, 3 pages.

*Primary Examiner* — Matthew W Genack
(74) *Attorney, Agent, or Firm* — Slater Matsil, LLP

(57) ABSTRACT

It is possible to reduce latency and/or overhead when performing a platoon handover by using the leading vehicle in the platoon to communicate handover requests and/or initial resource requests (e.g., random access transmissions) on behalf of trailing vehicles in the platoon. In one example, a leading vehicle in a platoon communicates a handover request to a source AP to request handover of the entire platoon from the source AP to a target AP. In such an example, the source AP then communicates handover commands to each vehicle in the platoon without receiving separate handover requests from the trailing vehicles, thereby reducing overhead in the access network. The handover commands notify the trailing vehicles of the handover, and may be sequentially communicated to the trailing vehicles based on their order in the platoon.

22 Claims, 12 Drawing Sheets

(51) Int. Cl.
*H04W 36/32* (2009.01)
*H04W 36/36* (2009.01)

(58) Field of Classification Search
USPC .......................................... 455/436–444, 448
See application file for complete search history.

(56) References Cited

U.S. PATENT DOCUMENTS

| | | | |
|---|---|---|---|
| 2012/0178501 A1* | 7/2012 | Jiang | H04B 1/7085 455/561 |
| 2013/0029680 A1* | 1/2013 | Park | H04W 72/0406 455/450 |
| 2014/0050213 A1* | 2/2014 | Nguyen | H04W 56/0015 370/350 |
| 2014/0135008 A1* | 5/2014 | Yu | H04W 36/0077 455/436 |
| 2015/0181502 A1* | 6/2015 | Hans | H04W 40/22 455/437 |
| 2015/0208411 A1* | 7/2015 | Mochizuki | H04W 72/1226 455/452.1 |
| 2016/0112881 A1* | 4/2016 | Duan | H04L 43/16 455/422.1 |
| 2017/0055298 A1* | 2/2017 | Pawar | H04L 5/1469 |

FOREIGN PATENT DOCUMENTS

| | | |
|---|---|---|
| CN | 103702373 A | 4/2014 |
| EP | 2713644 A1 | 4/2014 |
| EP | 2863664 A1 | 4/2015 |

* cited by examiner

METHODS FOR DATA COMMUNICATION TO A PLATOON OF CONNECTED VEHICLES

The Application claims priority to U.S. Provisional Application 62/317,242 filed on Apr. 1, 2016 and entitled "Methods for Data Communication to a Platoon of Connected Vehicles," which is incorporated by reference herein as if reproduced in its entirety.

TECHNICAL FIELD

The present invention relates generally to managing the allocation of resources in a network, and in particular embodiments, to methods for data communication to a platoon of connected vehicles.

BACKGROUND

In the future, the automotive industry will offer connected vehicles that are capable of various driving automation features. These vehicles will consume significantly more data in order to support these features, and additional wireless communication infrastructure (e.g., interconnected wireless access points (APs)) are likely to be installed along the roadside in order to effectively support the increased data consumption.

SUMMARY OF THE INVENTION

Technical advantages are generally achieved by embodiments of this disclosure which describe methods for data communication to a platoon of connected vehicles.

In accordance with an embodiment, a method for sequential platoon handover is provided, as may be performed by a source access point. In this example, the method includes receiving a handover request from a leading vehicle in a platoon of vehicles. The leading vehicle is followed by one or more trailing vehicles. The handover request requests a handover from a source access point to a target access point. The method further includes transmitting handover commands to each of the one or more trailing vehicles in response to the handover request received from the leading vehicle without receiving separate handover requests from the trailing vehicles. An apparatus for performing this method is also provided.

In accordance with another embodiment, a method for a low-overhead platoon handover is provided, as may be performed by a trailing vehicle. In this example, the method includes receiving a handover command from a source access point without communicating a handover request to the source access point. The trailing vehicle follows a leading vehicle in the platoon of vehicles, and the handover command approves a handover requested by the leading vehicle. The method further includes receiving a handover complete command from a target access point. The handover complete command schedules resources of the target access point to the trailing vehicle. The method further includes transmitting or receiving data to or from the target access point over the scheduled resources. An apparatus for performing this method is also provided.

In accordance with yet another embodiment, a method for sequential platoon handover is provided, as may be performed by a target access point. In this example, the target access point receives a random access transmission from a leading vehicle in a platoon of vehicles. The leading vehicle is followed by one or more trailing vehicles, and the random access transmission requests scheduled resources of the target access point. The method further comprises transmitting handover complete commands to each of the one or more trailing vehicles based on the random access transmission received from the leading vehicle without receiving separate resource requests from the trailing vehicles. The handover complete command schedules resources of the target access point to the one or more trailing vehicles. An apparatus for performing this method is also provided.

In accordance with yet another embodiment, a method for a low-overhead platoon handover is provided, as may be performed by a trailing vehicle. In this example, the trailing vehicle receives a handover command from a source access point. The trailing vehicle follows a leading vehicle in the platoon of vehicles, and the handover command indicates a handover from the source access point to a target access point. The method further includes receiving a handover complete command from the target access point prior to transmitting any uplink signaling to the target access point. The handover complete command schedules resources of the target access point to the trailing vehicle. The method further includes transmitting or receiving data to or from the target access point over the scheduled resources. An apparatus for performing this method is also provided.

In accordance with yet another embodiment, a method for low overhead control signaling is provided, as may be performed by an access point. In this example, the method comprises receiving channel information from a leading vehicle in a platoon of vehicles, assigning a transmission parameter to the leading vehicle at a first time instance based on the channel information received from the leading vehicle, and assigning the transmission parameter to a trailing vehicle at a second time instance based on at least one of a speed at which the platoon of vehicles is traveling and a spacing between the leading vehicle and the trailing vehicle. An apparatus for performing this method is also provided.

In accordance with yet another embodiment, another method for low overhead control signaling is provided, as may be performed by a trailing vehicle. In this example, the method includes receiving a transmission parameter from an access point prior to communicating any channel information. The transmission parameter was assigned based on channel information received from a leading vehicle in the platoon of vehicles and at least one of a speed in which the platoon of vehicles is traveling and a spacing between the leading vehicle and the trailing vehicle. The method further includes transmitting or receiving a signal to or from the access point according to the transmission parameter. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
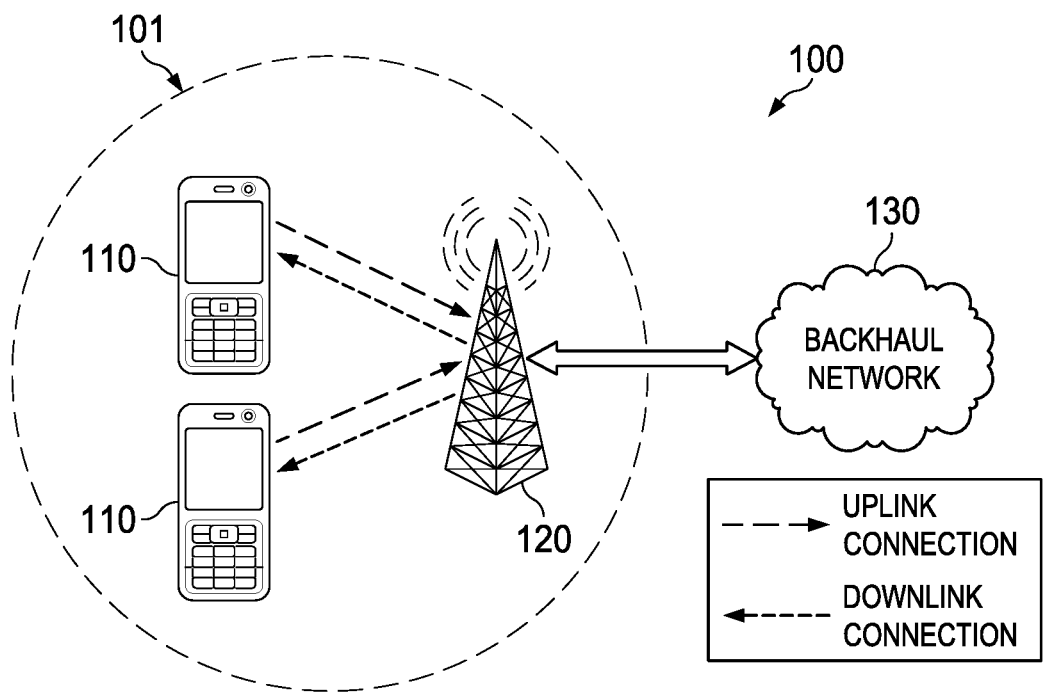
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

One autonomous driving feature that is likely to be of particular benefit is the concept of platooning, which refers to a platoon of vehicles moving along a roadway in a coordinated fashion. As referred to herein, the term "platoon of vehicles" refers to a train of vehicles that includes a leading vehicle and one or more trailing vehicle. A "platoon of vehicles" may be referred to as a "platoon" (for short) throughout this disclosure. Platooning may allow vehicles to accelerate and brake in a synchronized fashion, which may reduce congestion, as well as reduce the spacing between cars, thereby increasing fuel economy due to reduced air resistance. Because platoons may often travel at relatively high rates of speeds, it is likely that they will be handed over frequently in cellular networks.

Handovers typically require that each vehicle in the platoon send handover request messages to the source access point (AP) to initiate the handover, as well as send random access transmissions to the target AP to request that resources be scheduled to the vehicle for uplink and/or downlink data transmissions. This increases the latency of platoons handovers, as well adds significant overhead to the access network.

Embodiments of this disclosure reduce the latency and overhead associated with platoon handover by using the leading vehicle in the platoon to communicate handover requests and/or initial resource requests (e.g., random access transmissions) on behalf of one or more of the trailing vehicles in the platoon. In one example, a leading vehicle in a platoon communicates a handover request to a source AP to request handover of the entire platoon from the source AP to a target AP. In such an example, the source AP then communicates handover commands to each vehicle in the platoon without receiving separate handover requests from the trailing vehicles, thereby reducing overhead in the access network. The handover commands notify the trailing vehicles of the handover, and may be sequentially communicated to the trailing vehicles based on their order in the platoon. In another example, the leading vehicle communicates initial resource assignment request (e.g., a random access transmission) to a target AP to request resource assignments for all vehicles in the platoon. In such an example, the target AP then communicates handover commands to each vehicle in the platoon without receiving separate handover commands from the trailing vehicles, thereby reducing overhead in the access network. The handover complete commands may be sequentially transmitted to the trailing vehicles based on their order in the platoon. This may reduce handover latency for the trailing vehicles, as it allows the source AP to transmit the handover commands directly to the trailing vehicles without waiting to receive separate resource requests (e.g., random access transmissions) from the trailing vehicles.

Additional control signaling may be exchanged between trailing vehicles and the target AP following the handover to establish appropriate transmission parameters for bearer signaling. For example, vehicles may transmit channel information to the target AP so that the target AP can assign appropriate transmission parameters to the vehicles, such as modulation and coding scheme (MCS) levels, transmit power levels, beamforming weights for directional transmission and/or reception, timing advance parameters, etc. As used herein, the term "channel information" refers to any information that describes a property of a channel. In one embodiment, channel information includes channel state information (CSI) describing how a signal propagates over a channel, such as, for example, signal distortion due to scattering, fading, and/or path loss. Channel information may further include a complex channel response. All of this control signaling may significantly increase overhead in the access network. Embodiments of this disclosure further provide techniques for reducing overhead when configuring transmission parameters for trailing vehicles in the platoon. In one example, a target AP assigns a transmission parameter (e.g., MCS level, transmit-power level, timing advance, beamforming weights, etc.) to a trailing vehicle based on channel information received from a leading vehicles and at least one of a speed in which the platoon of vehicles is traveling and a spacing between the leading vehicle and the trailing vehicle. In such an example, the target AP may assign the transmission parameter prior to receiving any uplink control signaling from the trailing vehicle, thereby reducing overhead in the access network. In some embodiments the position of a trailing vehicle in a platoon can be estimated based on properties of the platoon (e.g., spacing, speed, length of vehicle), thereby allowing the amount of control signaling between the AP and trailing vehicles to be reduced. The benefits of such embodiments may include reduced latency, reduced signaling (e.g., less network traffic/ overhead), and/or higher efficiency (e.g., using better channel estimates to provide higher throughput services). In some embodiments, an access point assigns a transmission parameter value to a trailing vehicle based on at least one of a distance between a leading vehicle and the trailing vehicle in a platoon of vehicles and the speed of the platoon. The transmission parameter value may be any parameter used to transmit or receive an uplink or downlink signal, including (but not limited to) a beam direction, a transmit power level, and a timing advance value. These and other embodiments are described in greater detail below.

FIG. 1 illustrates a network 100 for communicating data. The network 100 comprises an access point (AP) 120 having a coverage area 101, a plurality of mobile devices no, and a backhaul network 130. As shown, the AP 120 establishes uplink (dashed line) and/or downlink (dotted line) connections with the mobile devices no, which serve to carry data from the mobile devices no to the AP 120 and vice-versa. Data carried over the uplink/downlink connections may include data communicated between the mobile devices no, as well as data communicated to/from a remote-end (not shown) by way of the backhaul network 130. As used herein, the terms "eNB" and "access point (AP)" refer to any component (or collection of components) configured to provide wireless access to a network. As used herein, the term "mobile device" refers to any component (or collection of components) capable of establishing a wireless connection with a base station, such as a user equipment (UE), a mobile station (STA), smart vehicles, and other wirelessly enabled devices. In some embodiments, the network 100 may comprise various other wireless devices, such as relays, low power nodes, etc.

Figure 2:
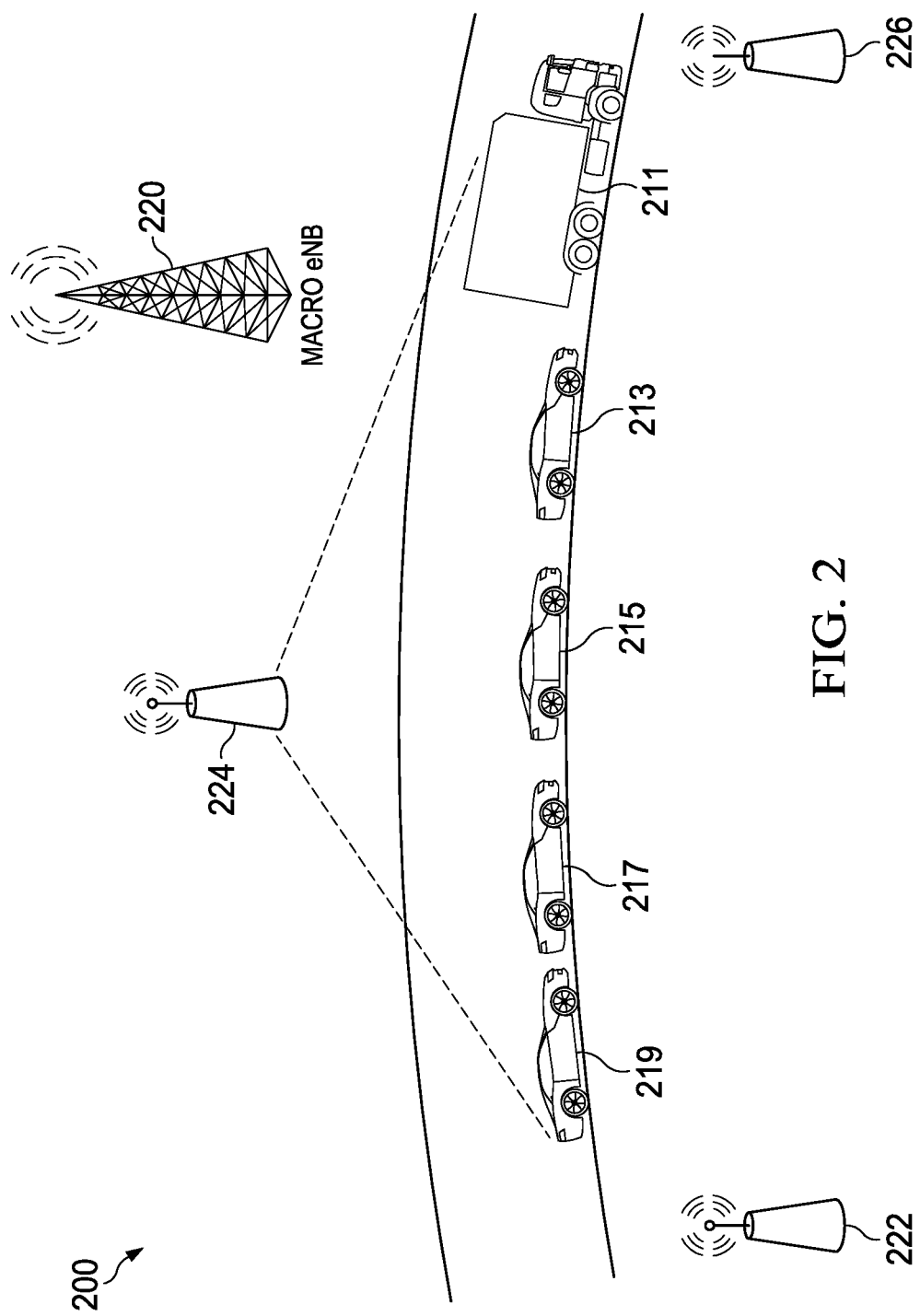
FIG. 2 illustrates a diagram of a network for supporting platoon handovers.

Embodiments of this disclosure provide techniques for reducing overhead and latency during, and immediately following, platoon handovers. FIG. 2 illustrates a network 200 for supporting platoon handovers. As shown, the network 200 includes a macro eNodeB (eNB) 220 and a plurality of APs 222-226. The APs 222-226 may also be referred to as "road side units (RSUs)" and/or "road side APs." The eNB 220 and the APs 222, 224, 226 may be interconnected through a backhaul network. The APs 222, 224, 226 may be configured to provide wireless access to a platoon that includes a leading vehicle 211 and a plurality of trailing vehicles 213-219. In this example, the platoon is handed over from a source AP 224 to a target AP 226.

Figure 3:
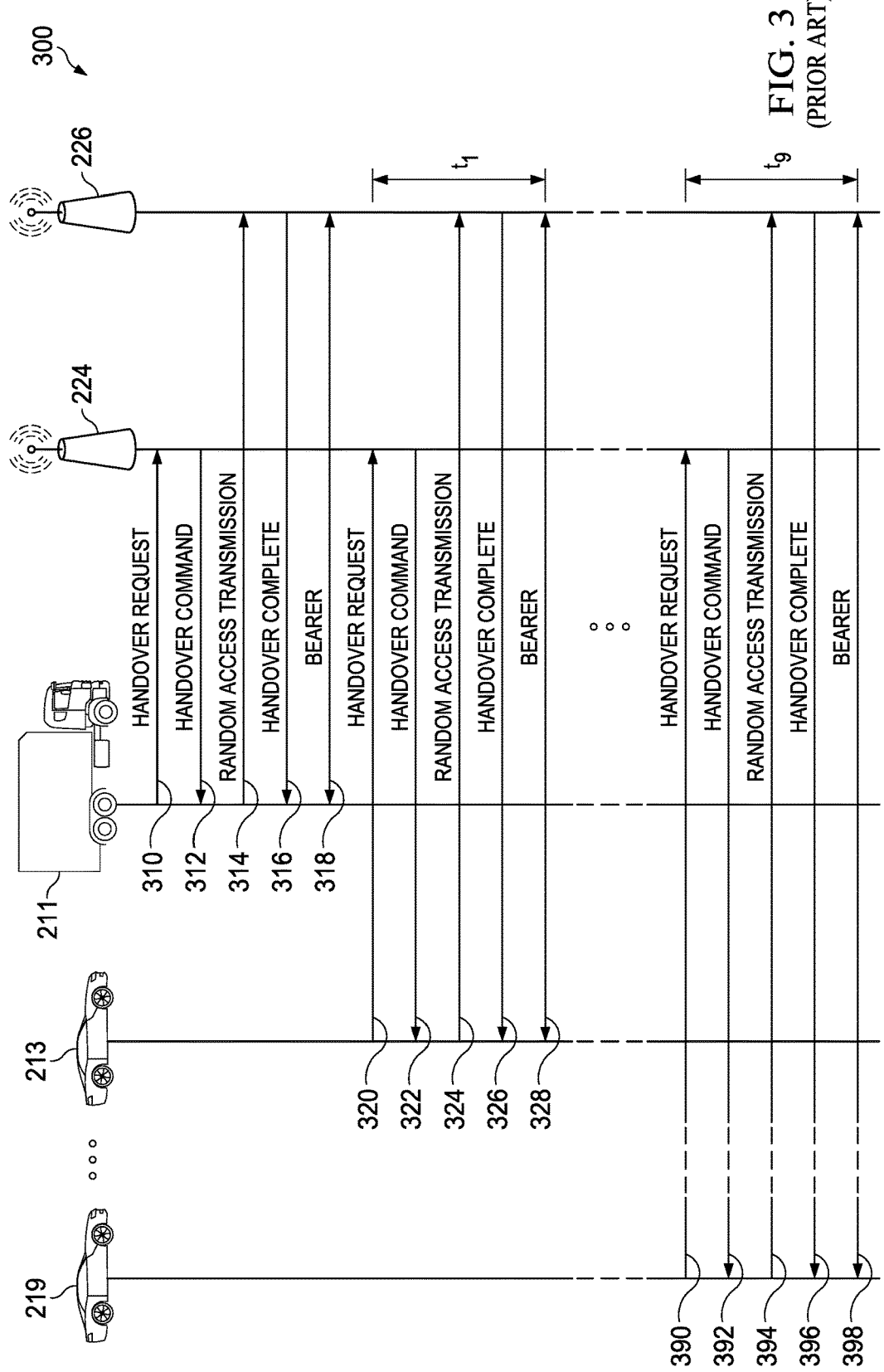
FIG. 3 illustrates a protocol diagram of a conventional communication sequence for platoon handover.

FIG. 3 illustrates a protocol diagram of a conventional communication sequence 300 for handing over a platoon from the source AP 224 to the target AP 226. It should be appreciated that the trailing vehicles 214-218 are omitted from FIG. 3 for purposes of brevity and clarity. As shown, the conventional communication sequence 300 begins when the leading vehicle 211 sends a handover request 310 to the source AP 224. The handover request 310 may include received signal measurement/values (e.g., reference signal received power (RSRP) measurements) of reference signals transmitted by the source AP 224 and the target AP 226. The handover request 310 may be transmitted shortly after the leading vehicle 211 discovers the target AP 226. Upon receiving the handover request 310, the source AP 224 sends a handover command 312 to the leading vehicle 211. The handover command 312 initiates a handover of the leading vehicle 211 from the source AP 224 to the target AP 226. Upon receiving the handover command 312, the leading vehicle 211 sends a random access transmission 314 to the target AP 226. The random access transmission 314 may request that the target AP 226 schedule resources to the leading vehicle 211. Thereafter, the target AP 226 sends a handover complete message 316 to the leading vehicle 211. The handover complete message 316 includes control signaling for establishing the bearer channel 318 over which uplink and/or downlink data transmissions are exchanged between the leading vehicle 211 and the target AP 226.

At some point, the trailing vehicles 213, 219 discover the target AP 226, and complete a similar handover protocol. In particular, the trailing vehicles 213, 219 send handover requests 320, 390 (respectively) to the source AP 224, receive handover commands 322, 392 (respectively) from the source AP 224, send random access transmissions 324, 394 (respectively) to the target AP 226, receive handover complete messages 326, 396 (respectively) from the target AP 226, and establish bearer channels 328, 398 (respectively) with the AP 226. The information/requests carried/conveyed by the handover requests 320, 390, the handover commands 322, 392, the random access transmissions 324, 394, and the handover complete messages 326, 396 are similar to the information/requests carried/conveyed by the handover request 310, the handover command 312, the random access transmission 314, and the handover complete message 316 described above. The labels "$t_1$" and "$t_9$" in FIG. 3 represent the handover latency experienced by the trailing vehicle 213, 219 (respectively) during the embodiment communication sequence 300.

Figure 4:
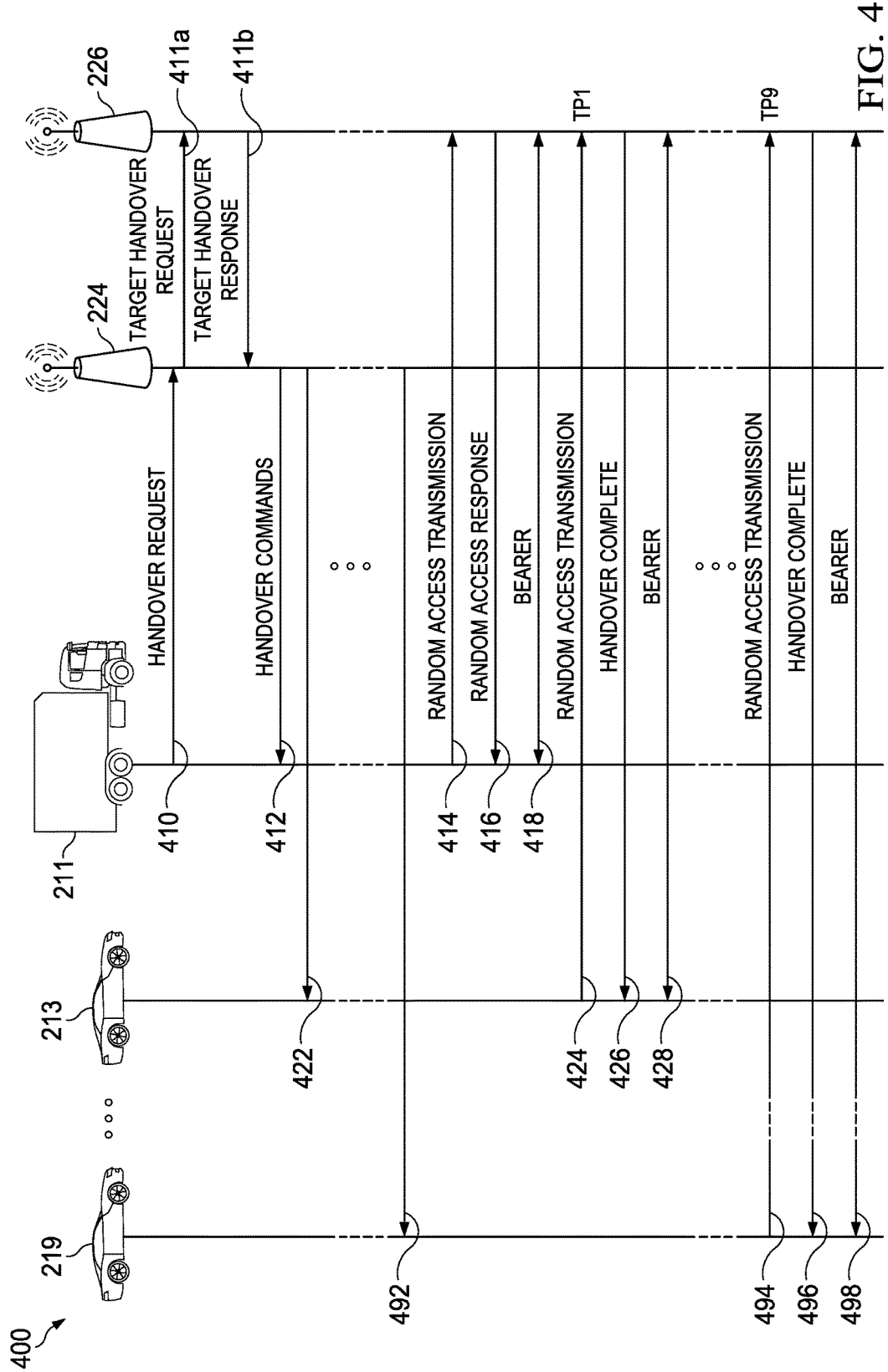
FIG. 4 illustrates a protocol diagram of an embodiment communication sequence for platoon handover.

Embodiments of this disclosure reduce the overhead and latency involved with platoon handovers. FIG. 4 illustrates a protocol diagram of an embodiment communication sequence 400 for platoon handover. It should be appreciated that the trailing vehicles 214-218 are omitted from FIG. 4 for purposes of brevity and clarity. In the embodiment communication sequence 400, the leading vehicle 211 sends a handover request 410 to the source AP 224. The handover request 410 requests a handover of the entire platoon, including the trailing vehicles 213, 219. The handover request can be a measurement report indicating signal measurements of access points for a possible handover. In some embodiments, the handover request 410 includes information about the platoon, such as an identifier of the platoon, the current speed of the platoon, the number of vehicles in the platoon, the current acceleration/deceleration of the platoon, vehicle spacing, location coordinates of the lead vehicle 211 and/or trailing vehicles 213, 219, and/or subscriber specific information of the leading vehicle 211 and/or the trailing vehicles 213, 219. In alternate embodiments, information about the platoon can be made available to source AP prior to the time of the handover, for example using independent signaling. For example, when a platoon is formed is or arrives in a cell (via a handover), the AP can request a vehicle in the platoon for information about the platoon. The vehicle can then respond with information about the platoon.

Upon receiving the handover request 410, the source AP 224 sends a target handover request 411a to the target AP 226. The target AP returns a handover request Ack 411b to the source AP 224, after optionally performing admission control. The target handover request may include information related to platoon operation. For example, the target handover request 411a may include one or more of the speed of the platoon, the number of vehicles in the platoon, the identifiers of the vehicles in the platoon, the spacing between vehicles in the platoon, connection parameters of vehicles in the platoon. The target handover request 411a may further include information about the platoon that is used when the platoon moves to the target AP 226. The source AP sends handover commands 412, 422, 492 to the leading vehicle 211, the trailing vehicle 213, and the trailing vehicle 219 (respectively). The handover command can be a Radio Resource Control (RRC) reconfiguration command. In this example, separate handover commands 422, 492 are communicated directly to the trailing vehicles 213, 219. In other examples, the handover commands 422, 492 are relayed through the leading vehicle 211. In yet other examples, a single handover command is broadcast to all vehicles in the platoon. Such a broadcast handover command may be addressed based on a platoon identifier that is known to all vehicles in the platoon.

The handover commands 422, 492 may instruct the trailing vehicles 213, 219 to perform the random access transmissions 424, 494 to the target AP 226 during time periods TP1, TP9 in a sequence of time periods. The order of the time periods TP1, TP9 in the sequence of time periods corresponds to the position of the trailing vehicles 213, 219 within the platoon such that the trailing vehicle 213 is assigned an earlier time period than the trailing vehicle 219. The handover commands 422, 492 can instruct the trailing vehicles 213, 219 to perform the random access transmissions 424, 494 to the target AP 226 during the time periods TP1, TP9 in various ways. In this way, the target AP 226 may essentially reserve, or otherwise set aside, a set of resources for the random access transmissions 424, 494. For example, the handover commands 422, 492 may explicitly identify the time periods TP1, TP9 and/or the sequence of time periods by identifying, for example, transmit time interval (TTIs), time windows, or subframes. Alternatively, the handover commands 412, 422, 492 may provide a formula to compute the time periods TP1, TP9. For example, the formula could be $t=t_o+n\times\delta$, where $t_o$ is the time of reception of the handover command, n is the index of the vehicle in the sequence and $\delta$ is the time duration for a vehicle to cover the length equal to the vehicle length plus the vehicle spacing. Each vehicle can then compute the interval $[t-\Delta, t]$ as the interval in which it performs the handover access to the target AP, where $\Delta$ is a duration in which the handover process of a vehicle should be initiated. The parameters $\delta$ and $\Delta$ may be included in the handover commands 422, 492. Alternatively, the parameters $\delta$ and $\Delta$ may be a priori information of the trailing vehicles 213, 219. In one embodiment, the formula is a priori information to the trailing vehicles 213, 219, and one or more of the parameters are communicated in the handover commands 422, 492. In such embodiments, some parameters may be communicated in the handover command 422, 492, while other parameters may be a priori information of the trailing vehicles 213, 219.

The handover commands 422, 492 may also provide transmission parameters for the random access transmissions 424, 494. For example, the handover commands 422, 492 can indicate a random access preamble or identifier to be used by the trailing vehicles 213, 219.

Upon receiving the handover command 412, the leading vehicle 211 sends a random access channel transmission 414 to the target AP 226. The random access transmission 414 may indicate the arrival of the leading vehicle 211 into the coverage of the target AP 226.

Thereafter, the target AP 226 sends a random access response (RAR)message 416 to the leading vehicle 211. The RAR message 416 may indicate that the handover is complete, or that the target AP 226 believes the handover to be complete. The RAR message 416 may also include control signaling (e.g., resource allocation information, an MCS level, etc.) for establishing the bearer channel 418 over which uplink and/or downlink data transmissions are exchanged between the leading vehicle 211 and the target AP 226. For example, the RAR message 416 may assign resources to carry an uplink transmission by the leading vehicle 211, as well as indicate a timing advance value to use for the uplink transmission.

At some point, the trailing vehicles 213, 219 discover the target AP 226, and complete a similar handover protocol. In particular, the trailing vehicles 213, 219 receive handover commands 422, 492 (respectively) from the source AP 224, send random access transmissions 424, 494 (respectively) to the target AP 226, receive handover complete messages 426, 496 (respectively) from the target AP 226, and establish bearer channels 428, 498 (respectively) with the AP 226. The information/requests carried/conveyed by the handover commands 422, 492, the random access transmissions 424, 494, and the handover complete messages 426, 496 are similar to the information/requests carried/conveyed by the handover command 412, the random access transmission 414, and the RAR message 416 described above.

Figure 5:
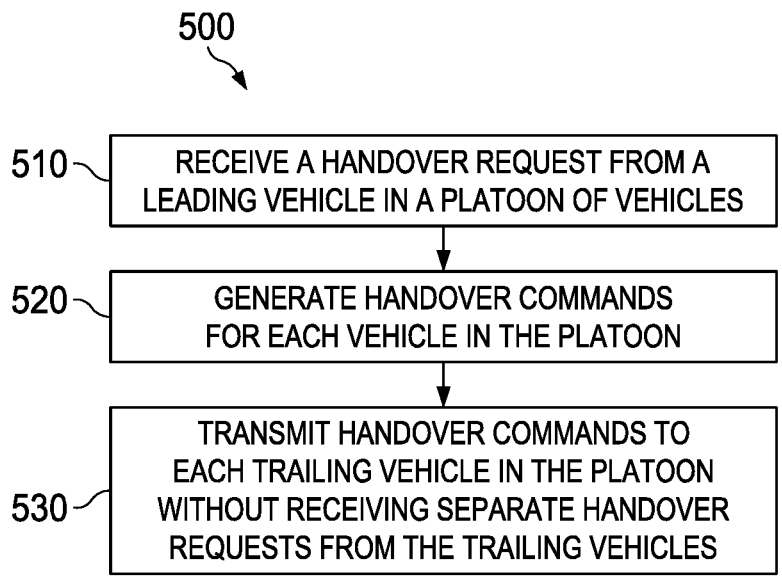
FIG. 5 illustrates a flowchart of an embodiment method for sequential handover of vehicles in a platoon

FIG. 5 illustrates a flowchart of an embodiment method 500 for sequential handover of vehicles in a platoon, as may be performed by a source AP. At step 510, the source AP receives a handover request from a leading vehicle in a platoon of vehicles. The leading vehicle is followed by one or more trailing vehicles. The handover request requests a handover from a source AP to a target access. At step 520, the source AP generates handover commands for each vehicle in the platoon. At step 530, the source AP transmits handover commands to each trailing vehicle in the platoon without receiving separate handover requests from the trailing vehicles.

The handover commands may be transmitted by the source AP at a time during which, or just prior to which, the corresponding vehicle is expected to begin the handoff, and may instruct the trailing vehicles to transmit uplink random access transmissions to the target AP according to a sequence of time periods. Trailing vehicles positioned nearer to the leading vehicle may be assigned earlier time periods than trailing vehicles positioned further from the leading vehicle. The handover commands may be communicated directly from the source AP to the trailing vehicles. Alternatively, the handover commands may be relayed indirectly through the leading vehicle such that the handover commands are first communicated from the source AP to the leading vehicle, and then from the leading vehicle to the trailing vehicles via direct vehicle-to-vehicle communication.

Figure 6:
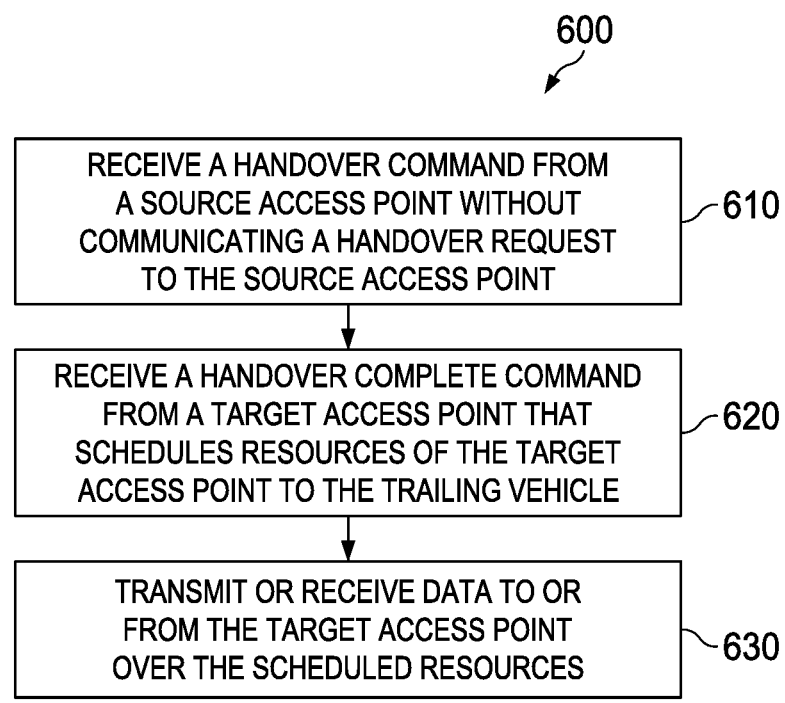
FIG. 6 illustrates a flowchart of an embodiment method for low overhead handover of vehicles in a platoon.

FIG. 6 illustrates a flowchart of an embodiment method for 600 for low-overhead handovers of vehicles in a platoon, as may be performed by a trailing vehicle in the platoon. In step 610, the trailing vehicle receives a handover command from a source AP without communicating a handover request to the source AP. The trailing vehicle follows a leading vehicle in the platoon of vehicles, and the handover command approves a handover requested by the leading vehicle. At step 620, the trailing vehicle receives a handover complete command from a target AP. The handover complete command scheduling resources of the target AP to the trailing vehicle. At step 630, the trailing vehicle transmits or receives data to or from the target AP over the scheduled resources.

In some embodiments, the handover complete command is received from the target AP prior to the trailing vehicle transmitting any uplink signaling to the target AP. The handover command received from the source AP may instruct the trailing vehicle to transmit an uplink random access transmission in a corresponding time period in a sequence of time periods. A delay between the time period assigned to the trailing period and an earlier time period assigned to a leading vehicle may correspond to a distance (or a time) between the trailing vehicle and the leading vehicle.

Figure 7:
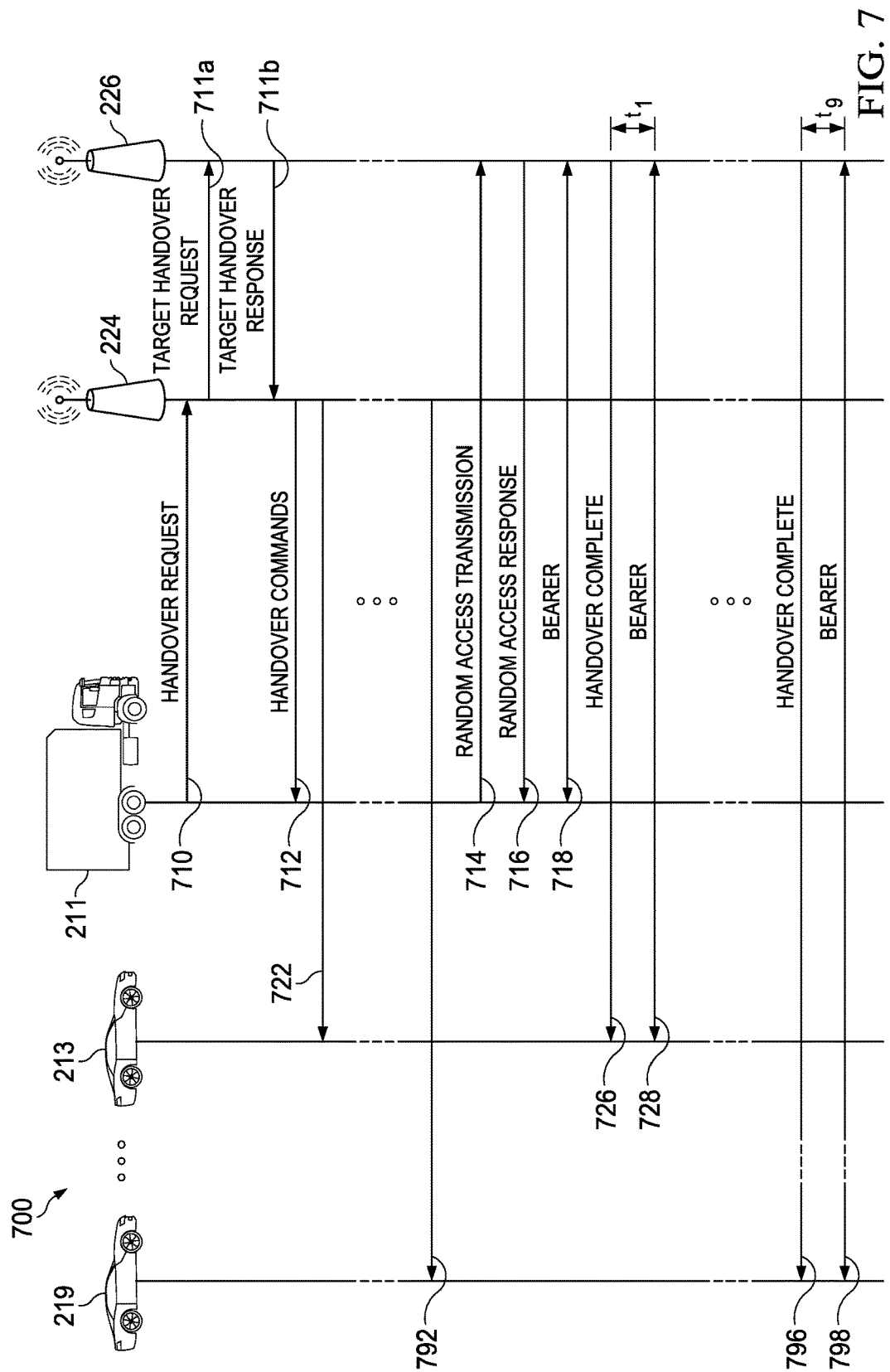
FIG. 7 illustrates a protocol diagram of another embodiment communication sequence for platoon handover.

Embodiments of this disclosure may achieve additional overhead reduction, as well as a reduction in handover latency, by having a leading vehicle transmit a random access transmission that requests resources be scheduled to trailing vehicles. FIG. 7 illustrates a protocol diagram of an embodiment communication sequence 700 for platoon handover. The handover request 710, the target handover request 711a, the target handover response 712a, and the handover commands 712, 722, 792 carry similar content/requests as the handover request 410, the target handover request 411a, the target handover response 412a, and the handover commands 412, 422, 492 described in FIG. 4. After receiving the handover command 712, the leading vehicle 211 sends a random access transmission 714 to the target AP 226. In response to the random access transmission 714, the target AP 226 allocates resources to both the leading vehicle 211 and the trailing vehicles 213, 219. This allows the trailing vehicles 213, 219 to receive resource assignments without communicating random access transmissions, which reduces overhead as well as handover latency for the trailing vehicles 213, 219. The labels "$t_1$" and "$t_9$" in FIG. 7 represent the handover latency experience by the trailing vehicle 213, 219 (respectively) during the embodiment communication sequence 700. It should be appreciated that the random access transmissions referred to throughout this disclosure may allow target APs to determine transmission timing and/or power adjustments, or settings, for a corresponding vehicle. It should also be appreciated that, in some embodiments, a transmission timing and/or power adjustment/setting for a trailing vehicle can be based on a random access transmission performed by a leading vehicle.

Upon receiving the random access transmission 714, the target AP 226 communicates a random access response 716 to the leading vehicle 211, and handover complete messages 726, 796 to the trailing vehicles 213, 219 (respectively). The RAR message 716 and the handover complete messages 726, 796 carry control signaling for establishing the bearer channels 718, 728, 798 (respectively).

In some embodiments, vehicle to vehicle communication is used during platoon handover. For example, upon receiving the RAR message 716, the lead vehicle 211 may forward handover complete indications to the trailing vehicles 213, 219 to inform the trailing vehicles 213, 219 that the leading vehicle 211 has been successfully handed over to the target AP 226. The handover complete indications may include other information as well, such as a time in which the target AP 226 was discovered by the leading vehicle 211, a time in which the random access transmission 714 was transmitted, a speed of the platoon, a received power level (or other measurement) of a signal transmitted by the source AP 224 when the target AP 426 was discovered by the leading vehicle 211, a directional transmission parameter (e.g., an estimated angle of arrival) of a signal received from the target AP 224, an identifier (ID) assigned to the target AP 226, a synchronization sequence associated with the target AP 226, and/or a time offset associated with the target AP 226. In some embodiments, the handover complete indications are communicated in lieu of the handover commands 722, 792, in which case the trailing vehicles 213, 219 may use the information in the handover complete indications to determine the appropriate times to perform handovers.

Additionally, vehicle to vehicle communication can be used to form a platoon with, or without, assistance from infrastructure communications. Vehicle to vehicle communication may also allow connected vehicles (e.g., vehicles with active connections with road side APs) to communicate with idle vehicles (e.g., vehicles in the platoon that do not have active connections with road side APs). This may allow the network to know which precise cell or cells the idle vehicle is likely to be in, thereby reducing signaling related to paging. Sharing of handover occurrences of the lead vehicle and some system information of the new cell with other vehicles can also help the idle vehicles transition from idle mode to an active mode (e.g., to establish a connection with the network). For example, knowledge of random access information in the target cell can speed up link setup. Vehicles in the platoon may be connected to networks of different operators. In this case "sub-platoons" could be formed, with each sub-platoon consisting of vehicles associated with one operator. The sub-platoon can then be handled as a platoon by the network of each operator. If a vehicle joins or leaves the platoon, the platoon information may be updated in the network. Similarly, the network may be notified of other changes in the platoon, such as a change in the vehicle spacing.

Figure 8:
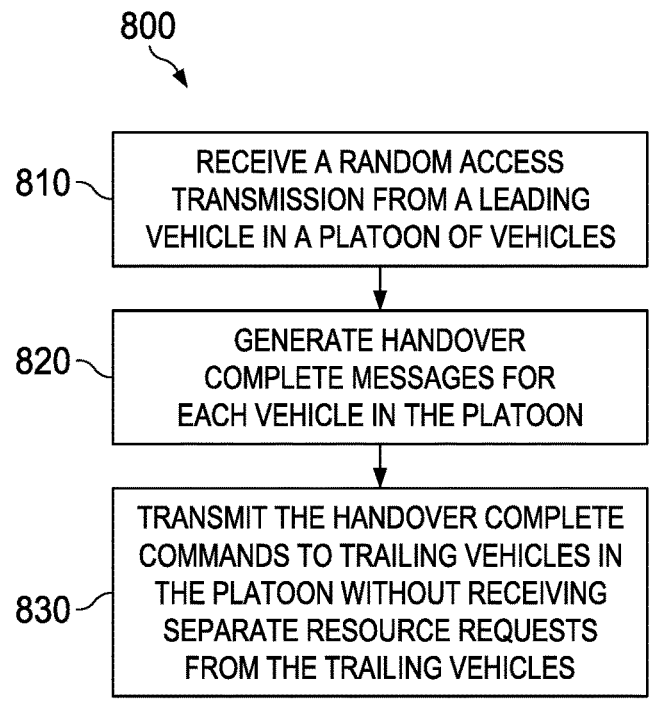
FIG. 8 illustrates a flowchart of another embodiment method for sequential handover of vehicles in a platoon.

FIG. 8 illustrates a flowchart of an embodiment method 800 for sequential handovers, as may be performed by a target AP. At step 810, the target AP receives a random access transmission from a leading vehicle in a platoon of vehicles. The leading vehicle is followed by one or more trailing vehicles. The random access transmission requests scheduled resources of the target AP. At step 820, the target AP generates handover complete commands for each of the trailing vehicles based on the random access transmission received from the leading vehicle. At step 830, the target AP transmits the handover complete commands to the trailing vehicles without receiving separate resource requests (e.g., random access transmissions) from the trailing vehicles. The handover complete commands schedule resources of the target AP to the trailing vehicles. The handover complete commands may be sequentially transmitted from the target AP to the trailing vehicles based on an order of the trailing vehicles in the platoon of vehicles. The handover complete commands may be communicated from the target AP to each of the trailing vehicles prior to the target AP receiving a separate uplink transmission from the respective trailing vehicle.

Figure 9:
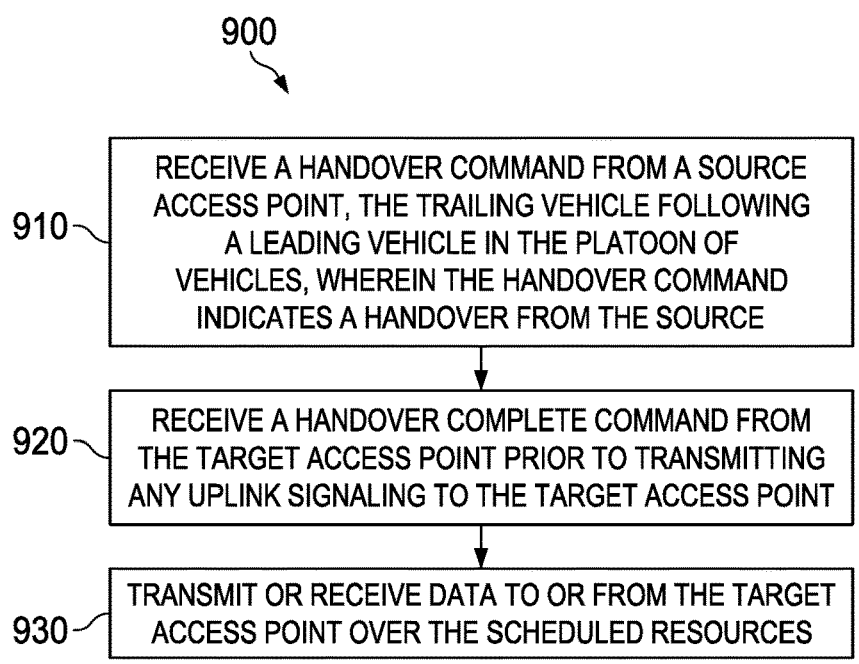
FIG. 9 illustrates a flowchart of another embodiment method for low overhead handover of vehicles in a platoon.

FIG. 9 illustrates a flowchart of an embodiment method 900 for sequential handovers, as may be performed by a trailing vehicle. At step 910, the trailing vehicle receives a handover command from a source AP. The trailing vehicle follows a leading vehicle in a platoon of vehicles. The handover command indicates a handover from the source AP to a target AP. At step 920, the trailing vehicle receives a handover complete command from the target AP prior to transmitting any uplink signaling to the target AP. The handover complete command schedules resources of the target AP to the trailing vehicle. At step 930, the trailing vehicle transmits or receives data to or from the target AP over the scheduled resources.

Embodiments of this disclosure also provide techniques for reducing overhead related to channel information feedback from trailing vehicles in the platoon. Channel information is reported to APs so that transmission parameters can be adapted based on channel conditions (e.g., the channel impulse response), which may vary dynamically based on various factors, such as fast fading. Generally speaking, the channel conditions are non-varying for a coherence time duration, which is a function of the Doppler spread seen on the channel. For example, for a 2 GHz carrier with a vehicle moving at 30 km/h towards the AP, the coherence time can be as small as 3.8 milliseconds. From this, it is possible that channel information may become inaccurate (e.g., stale) after 3.8 ms, and would therefore need to be fed back quite frequently, e.g., every 1-2 ms. However, for vehicles that are stationary, or moving relatively slowly, the coherence time duration can be significantly longer.

Embodiments of this disclosure use channel information fed-back by earlier vehicles in a platoon to reduce the amount of channel information fed-back by later vehicles. In particular, the channel information of an earlier vehicle at a given position may be used to predict the channel response of a later vehicle when the later vehicle passes through that given position at a later instance in time. As a result, the later vehicle may be able to feedback channel information to the AP less frequently and/or over few subcarriers.

In one example, an AP receives channel information feedback from a leading vehicle as the leading vehicle passes through the coverage area of the AP, and stores the channel information indexed by time. The AP then uses the channel information received from the leading vehicle to estimate channel responses/information of one or more of the trailing vehicles based on a speed at which the platoon of vehicles is traveling and/or a spacing between the leading vehicle and the one or more trailing vehicles.

Figure 10:
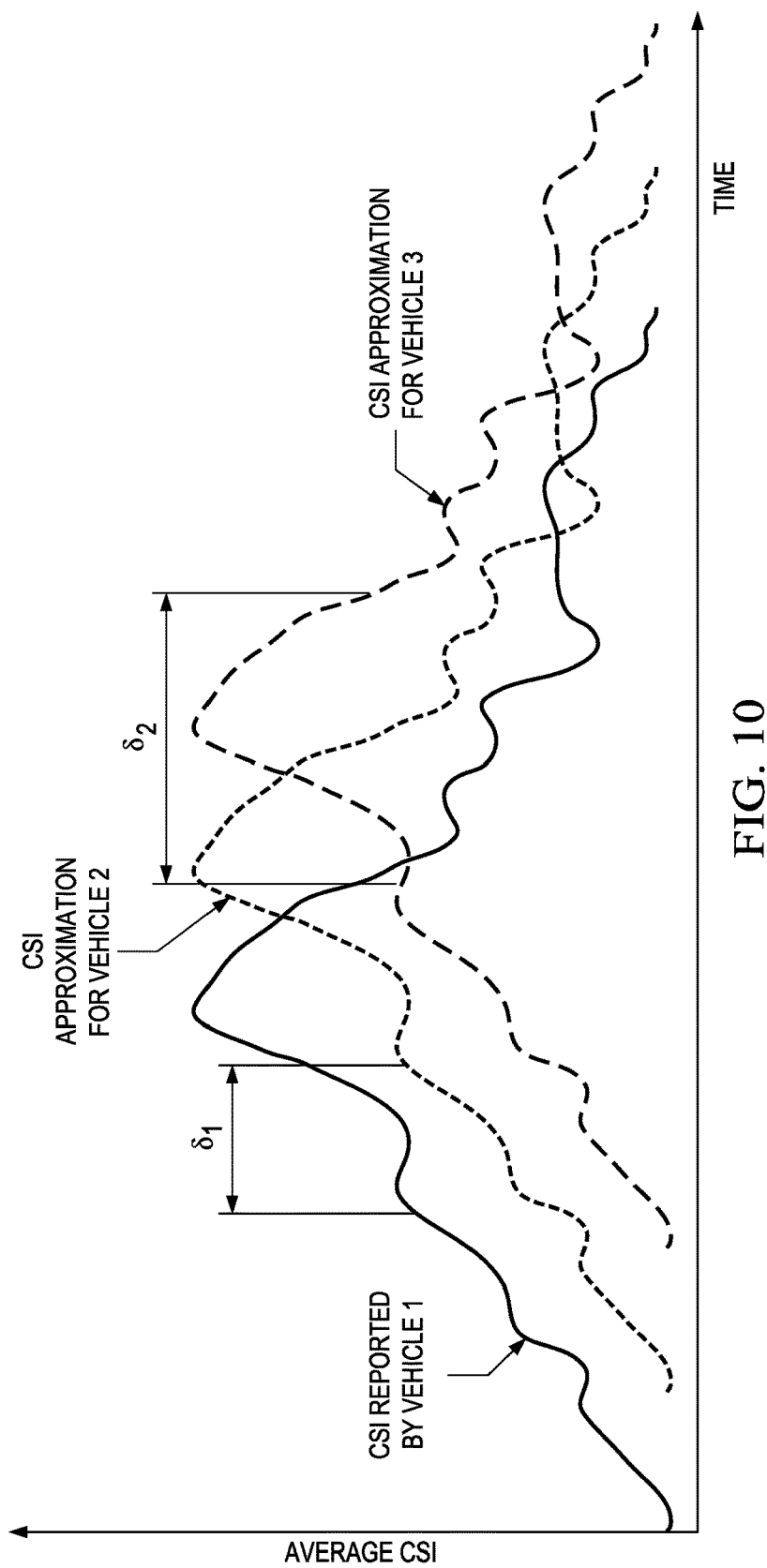
FIG. 10 illustrates a graph of channel information estimates for vehicles in a platoon.

For example, the approximated CSI for vehicle n-th vehicle in the platoon at time t would be the CSI reported by the leading vehicle at an approximate time of $t-(n-1)\times\delta$, where $\delta$ is calculated as distance/speed, where distance is the spacing between the front of two vehicles and speed is the speed of the platoon. FIG. 10 illustrates a graph of channel information estimates for vehicles in a platoon. As shown, the CSI reported by vehicle 1 is time-shifted according to $\delta_1=1\times\delta$ and $\delta_2=2\times\delta$ in order to approximate CSI for trailing vehicles 2 and 3, where $\delta_1$ is calculated based on a speed of the platoon and a spacing between vehicle 1 and vehicle 2, and $\delta_2$ is calculated based on a speed of the platoon and a spacing between vehicle 2 and vehicle 3.

In some embodiments, one of the vehicles in the platoon reports the speed of the platoon to the AP. In other embodiments, the AP estimates the speed of the platoon by observing signals transmitted by the vehicles in the platoon. This may further reduce overhead in the network.

In some embodiments, multiple vehicles in the platoon report channel information. For example, every third vehicle in the platoon could report channel information. In yet other embodiments, later vehicles may report channel information less frequently than earlier vehicles. For example, a leading vehicle may report channel information at a periodicity of $T_1$, the next vehicle may report channel information at a periodicity of $T_2$ (where $T_2>T_1$), the next vehicle may report channel information at a periodicity of $T_3$ (where $T_3>T_2$). These embodiments may allow the AP to estimate channel information for trailing vehicles in the platoon by comparing channel information estimated by multiple vehicles passing through the same location.

In some embodiments, an earlier vehicle will send information regarding a later vehicle to the AP. For example, the earlier vehicle may inform the AP that the later vehicle has a higher or lower receiver sensitivity than the earlier vehicle, which may enable the AP to adjust its approximation of channel information for the later vehicle. If a later vehicle finds the MCS used for downlink transmissions to be too conservative or aggressive, it can send an uplink feedback to notify the AP. The uplink feedback message may include channel information estimated by the later vehicle.

In another embodiment, different vehicles in the platoon report channel information for different portions of the frequency spectrum (e.g., different sub-bands). This may allow the AP to compare channel information reported from different locations over different frequencies, while still reducing the overhead associated with channel information feedback of the platoon.

Figure 11:
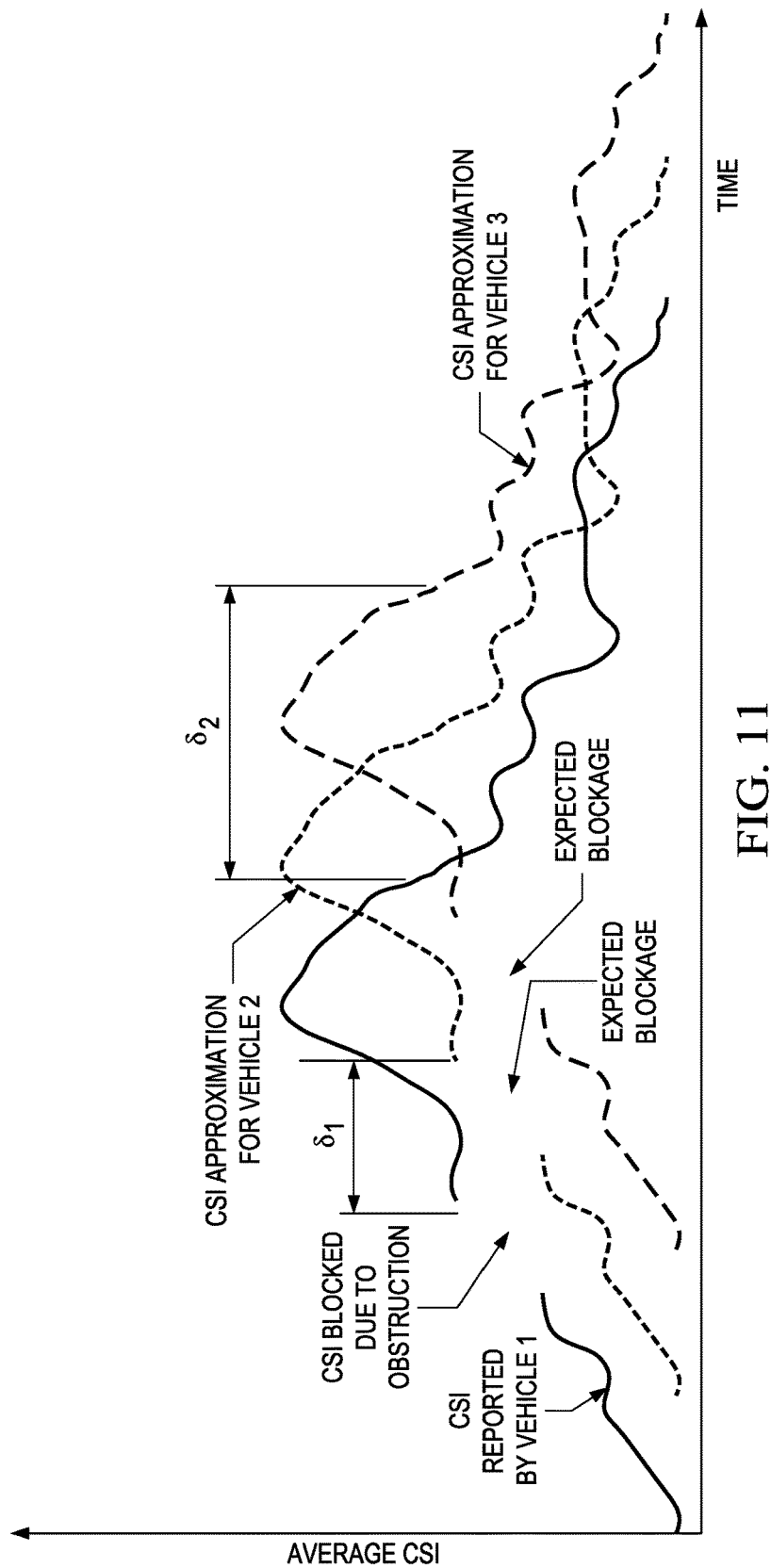
FIG. 11 illustrates a graph of obstruction period estimations for vehicles in a platoon.

In some instances, channel information feedback reported by an earlier vehicle is blocked by an obstruction, e.g., an object, etc. In such instances, the AP may notice that the channel information was not received from the earlier vehicle as scheduled, and predict that the obstruction will also block, or otherwise impede, a communication path of a later vehicle at a future instance in time, e.g., based on a time-shift determined by a vehicle spacing and/or speed of the platoon This information can be used by the AP to adjust scheduling such that interference due to the obstruction is mitigated. By way of example, the AP can adjust a time period in which the later vehicle receives a downlink transmission and/or receives an uplink transmission (e.g., data, channel information, etc.). As another example, the AP may adjust an MCS level of the later vehicle in order to compensate for path loss attributable to the obstruction. The AP can prioritize delivery of certain packets before a later vehicle arrives at the expected blockage location. Later vehicles may experience different blockage characteristics due to the antenna placement. For example, a particular obstruction (e.g., a concrete barrier) may more significantly obstruct shorter vehicles (e.g., sedans) than taller vehicles (SUVs) due to the height of the antenna. Accordingly, the AP may schedule taller vehicles to transmit or receive data at the obstruction location. Similarly, later vehicles may experience different blockage characteristics due to the frequency over which they transmit/receive signals. For example, vehicles that communicate over higher carrier frequencies (e.g., millimeter wave (mmWaves), etc.) may experience higher path loss from a given obstruction (e.g., a line of sight obstruction) than vehicles that communicate over lower carrier frequencies (e.g., cellular frequencies, etc.). Accordingly, the AP may schedule the vehicles to communicate over higher carrier frequencies to transmit or receive data. The AP may then recognize a location where the communication to the leading vehicle over the higher carrier frequencies is obstructed. In the event that a later vehicle has the capability to communicate over multiple carrier frequencies, the AP may schedule the later vehicle to a lower frequency at the obstruction location. Alternatively, the AP may perform a handover to avoid, or mitigate, interference due to the obstruction. Other examples are also possible. FIG. 11 illustrates a graph of how obstruction periods for later vehicles in a platoon can be estimated based on uplink transmission of earlier vehicles in the platoon.

In conventional networks, APs assign timing advances to vehicles based on a propagation delay of uplink transmissions received from the users. Timing advance may be updated when a vehicle is moving. For example, an AP may update a timing advance of a vehicle if received uplink signals are migrating out of the assigned time window. However, if a vehicle travels a significant distance during a period in which no uplink transmission are performed, then APs in conventional networks may be unable to determine the appropriate timing advance to assign to the vehicle when the vehicle resumes uplink transmission. Conventional techniques for addressing this communicate an unsynchronized transmission such as a random access transmission to determine the timing advance, and then resume grant-based transmissions. The random access transmission may collide with a random access transmission from another user, increasing overhead in the network, as well as further delaying the uplink transmission.

Embodiments of this disclosure address this by assigning a timing advance to a later vehicle in a platoon based on an uplink transmission of an earlier vehicle in the platoon. The uplink transmission of the earlier vehicle may be a scheduled transmission or unscheduled, random access transmission. The timing advance may be assigned based on time shift calculated based on between the speed and vehicle spacing of the platoon. By way of example, the AP may determine a mapping between timing advance and time, based on measurements of uplink transmissions of many vehicles. Once the timing advance mapping is determined based on transmissions of earlier vehicles, a timing advance profile may be assigned (and communicated) to a later vehicle. The later vehicle may be a vehicle that has been idle or a vehicle that has just entered a coverage area of the AP, e.g., during a handover. The timing advance profile enables the vehicle in the platoon to calculate the required timing advance at different locations as it proceeds through the cell. The profile may be specified in terms of one or more linear equations, or one or more non-linear equations. Alternatively, an earlier vehicle can periodically communicate timing advance value that it is using to later vehicles via vehicle to vehicle communication. This can then enable vehicles to proactively adjust their timing advances.

Embodiments of this disclosure reduce overhead when assigning beamforming parameters to later vehicles in a platoon. Directional transmission and/or reception is performed by applying different beamforming weights to signals communicated over different elements of a MIMO antenna array. In conventional networks, directional beam scanning is performed to determine which set of beamforming weights provides the desired level of performance. Directional beam scanning may be time consuming, as well as add significant amount of overhead to the network. Directional beam scanning becomes much more difficult when vehicles are moving. According to embodiments of this disclosure, vehicles in a platoon may cooperatively scan for beams so that the task of discovering APs can be performed jointly across the vehicles.

Figure 12:
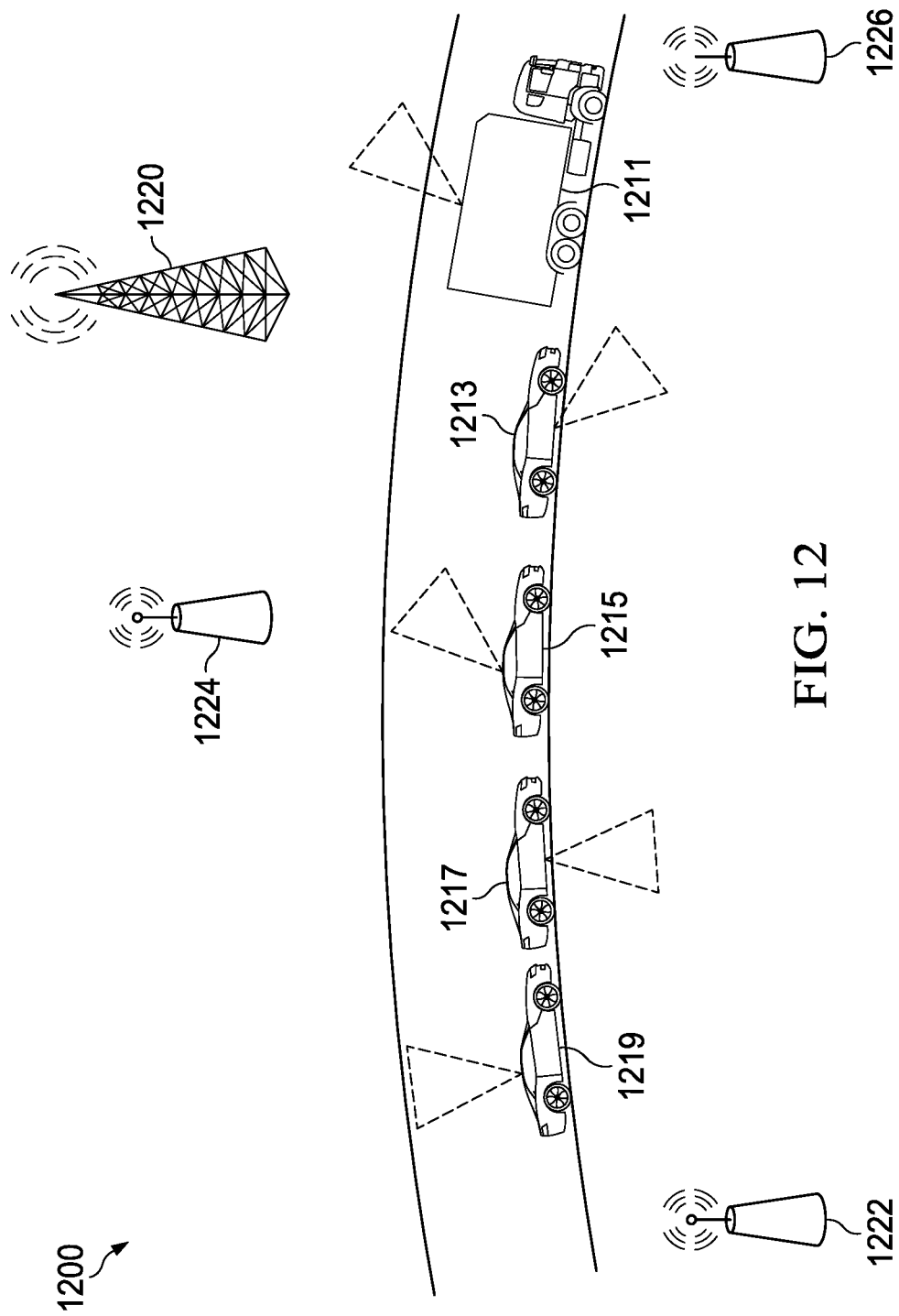
FIG. 12 illustrates a network for supporting cooperative beam-scanning amongst vehicles in a platoon.

FIG. 12 illustrates a network 1200 for supporting cooperative beam-scanning amongst vehicles in a platoon. As shown, the network 1200 includes an eNB 1220 and a plurality of APs 1222, 1224, 1226. The eNB 1220 and the APs 1222, 1224, 1226 may be interconnected through a backhaul network. The APs 1222, 1224, 1226 may be configured to provide wireless access to a platoon that includes a leading vehicle 1211 and a plurality of trailing vehicles 1213-1219. In this example, the platoon is handed over from a source AP 1224 to a target AP 1226. The lead vehicle 1211 provides information about the platoon (e.g., number of vehicles in the platoon) to the network. The network then assigns scanning directions to each vehicle 1211-1219 to use when scanning for the target AP 1226. The scanning directions may specify angles with respect to a reference angle and/or receive beam-forming weights. The vehicles 1211-1219 perform scanning based on the assigned directions. For each vehicle, the scanning may be time-multiplexed with ongoing communication with the source AP 1224. The serving AP 1224 may assign "scanning gaps" during which the vehicles 1211-1219 perform scanning. When a vehicle discovers the target AP 1226, information about the AP is shared with other vehicles in the platoon via vehicle-to-vehicle communication. The vehicles then use the information to determine the expected direction in which an AP can be located and the time at which the AP may become visible. This can also enable vehicles to prioritize between APs that they will scan for. The information provided may include the direction of the AP (horizontal and vertical angles), a position of vehicle in the platoon, a speed of vehicle, a strength of signal received from AP. The information may be exchanged between vehicles via direct vehicle-to-vehicle communication or indirect vehicle-to-vehicle communication (e.g., relayed through the serving AP 1224, etc.) The network may process the information and assign to vehicles prioritized directions and APs to scan for, as the vehicles move through the cell.

In some embodiments, an AP can maintain the beam-forming parameter values (e.g., beam-forming weights) used for the leading vehicle and use the same parameter values with a time delay for the trailing vehicles. Alternatively, a member of the platoon may perform scanning operations, and communicate the scanning results to the AP. Millimeter wave communications may suffer from high path loss propagation. In order to compensate for that, highly directional beam-forming may be performed. As a result, a vehicle may be able to receive signals from only a few directions, e.g., only one direction in some cases. This significantly increases the time, and overhead, required to perform beam-scanning. Embodiments of this disclosure address this by assigning each member of the platoon to scan in a different direction, which increases the chance that one of the vehicles will discover the AP. In such an embodiment, each vehicle receives a direction to monitor from either the AP (e.g., over a different frequency or wide beam) or platoon head (e.g., via vehicle-to-vehicle communication). The vehicles then report the results of the scan to the AP and/or the platoon head (leading vehicle). Having such an algorithm where each UE would scan a different direction could be very useful for initial access, for beamsteering algorithms such as the one employed by 802.11 ay, and for hierarchical hybrid beamforming algorithms.

Figure 13:
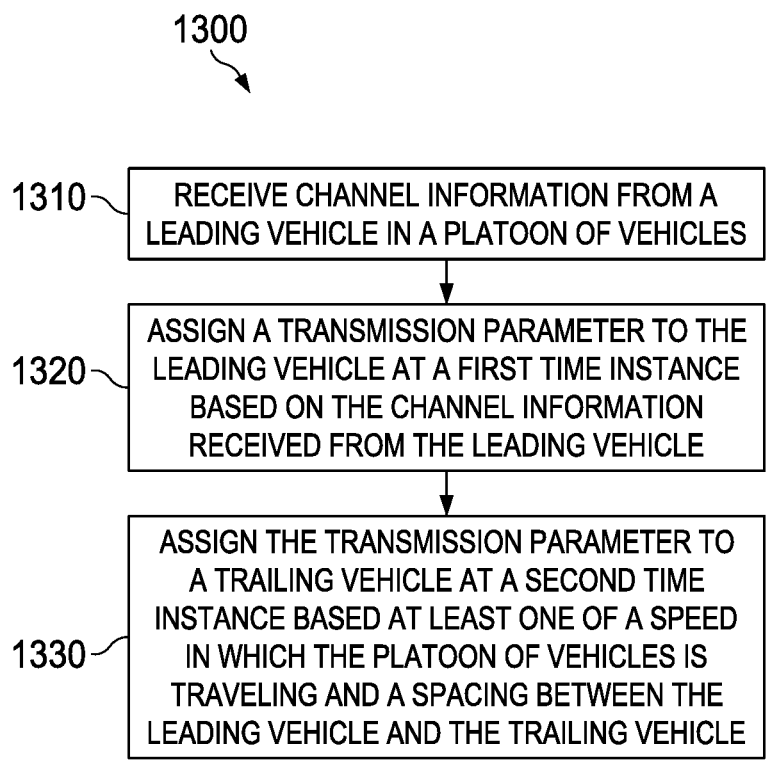
FIG. 13 illustrates a flowchart of an embodiment method for low overhead control signaling between an AP and vehicles in a platoon of vehicles.

FIG. 13 illustrates a flowchart of an embodiment method 1300 for low overhead control signaling between an AP and vehicles in a platoon of vehicles, as may be performed by the AP. At step 1310, the AP receives channel information from a leading vehicle in a platoon of vehicles. At step 1320, the AP assigns a transmission parameter to the leading vehicle at a first time instance based on the channel information received from the leading vehicle. At step 1330, the AP assigns the transmission parameter to a trailing vehicle at a second time instance. The transmission parameter may be assigned based on a speed in which the platoon of vehicles is traveling and/or a spacing between the leading vehicle and the trailing vehicle. The transmission parameter may be any type of transmission parameter, such as an uplink or downlink modulation and coding scheme (MCS) level, a set of beamforming weights used for uplink or downlink transmission, or an uplink timing advance corresponding to the length of time a signal takes to reach the AP.

Figure 14:
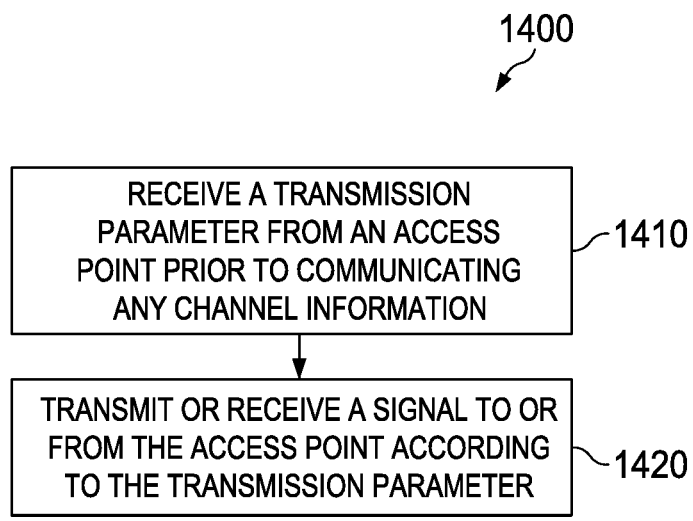
FIG. 14 illustrates a flowchart of another embodiment method for low overhead control signaling between an AP and vehicles in a platoon of vehicles.

FIG. 14 illustrates a flowchart of an embodiment method 1400 for low overhead control signaling between an AP and vehicles in a platoon of vehicles, as may be performed by a trailing vehicle in the platoon. At step 1410, the trailing vehicle receives a transmission parameter from an AP prior to communicating any channel information to the AP. The transmission parameter was assigned based on channel information received from a leading vehicle in the platoon of vehicles, as well as a speed in which the platoon of vehicles is traveling and/or a spacing between the leading vehicle and the trailing vehicle. At step 1420, the trailing vehicle transmits or receives a signal to or from the AP according to the transmission parameter.

In one embodiment, the transmission parameter received from the AP is an uplink or downlink modulation and coding scheme (MCS) level assigned by the AP. In such an embodiment, the trailing vehicle may estimate a channel information value based on a downlink reference signal received from the AP, compare a channel information value associated with the assigned MCS level with the estimated channel information value, and transmit an uplink feedback message including the estimated channel information value to the AP when a difference between the channel information value associated with the assigned MCS level and the estimated channel information value exceeds a threshold.

In another embodiment, the transmission parameter received from the AP includes at least one uplink timing advance corresponding to the length of time an uplink signal takes to reach the AP after being transmitted by the trailing vehicle. In yet another embodiment, the transmission parameter includes a sequence of timing advances. In such an embodiment, the trailing vehicle transmits a first uplink signal to the AP according to a first timing advance in the sequence of timing advances. After expiration of a delay period, the trailing vehicle transmits a second uplink signal to the AP according to a second timing advance in the sequence of timing advances. In yet another embodiment, the transmission parameter received from the AP is a set of beamforming weights used for uplink or downlink transmission.

Embodiments of this disclosure provide techniques for reducing the amount of control signaling (e.g., handover commands, handover requests, random access transmissions, CQI feedback/requests, etc.) for trailing vehicles in a platoon based on control signaling between APs and a leading vehicle in the platoon.) are types of control signals. It should be appreciated that signaling may be transmitted over shared channels in some networks. For example, in cellular networks such as LTE, downlink signaling may be transmitted over a physical downlink shared channel (PDSCH) and/or physical downlink control channel (PDCCH), and uplink signaling may be transmitted over a physical uplink shared channel (PUSCH) and/or physical uplink control channel (PUCCH). Random access transmissions may be transmitted over a random access channel (RACH). Similarly, vehicle to vehicle control signaling may be transmitted over a physical sidelink shared channel (PSSCH). In some embodiments, uplink control information (UCI) may carry channel quality information (CQI) over the PUCCH or PUSCH.

Figure 15:
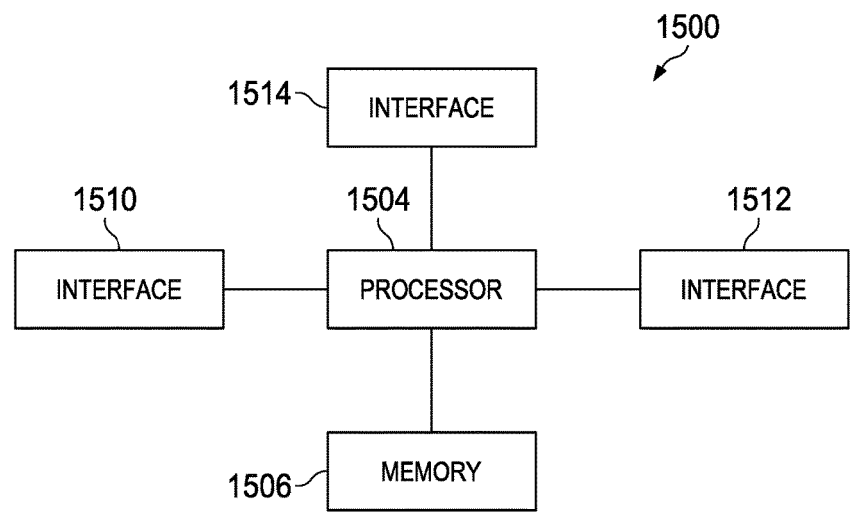
FIG. 15 illustrates a block diagram of a processing system.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC), etc.) to interact/communicate with the processing system 1500. The processing system 1500 may include additional components not depicted in FIG. 15, such as long term storage (e.g., non-volatile memory, etc.).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 16:
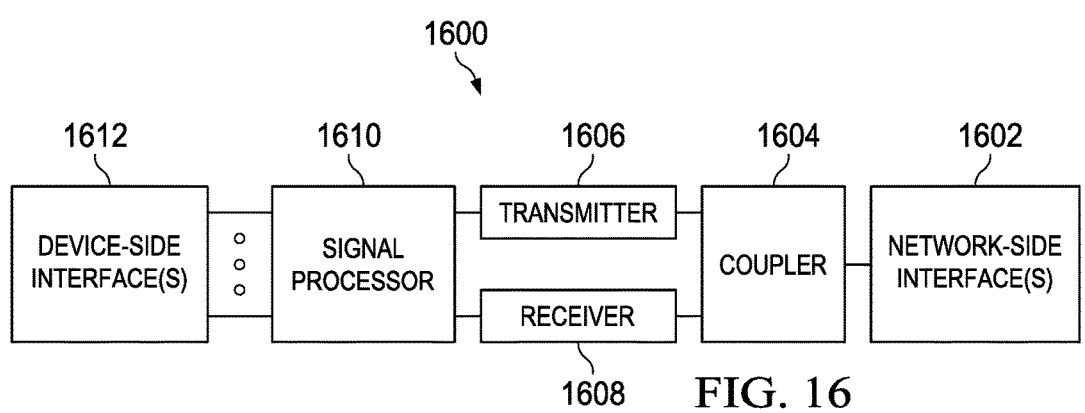
FIG. 16 illustrates a block diagram of a transceiver.

In some embodiments, one or more of the interfaces 1510, 1512, 1514 connects the processing system 1500 to a transceiver adapted to transmit and receive signaling over the telecommunications network. FIG. 16 illustrates a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports, etc.).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

What is claimed:

1. A method for low overhead control signaling, the method comprising:
    receiving, by an access point, channel information and platoon information from a leading vehicle in a platoon of vehicles, wherein the platoon information includes at least one of a speed of the platoon of vehicles and a spacing between vehicles in the platoon of vehicles;
    assigning, by the access point, a beam direction parameter to the leading vehicle at a first time instance based on the channel information received from the leading vehicle, the beam direction parameter including a set of beamforming weights or a spatial direction to be used for an uplink or downlink transmission; and
    assigning, by the access point, the beam direction parameter to a trailing vehicle at a second time instance based on at least one of the speed in which the platoon of vehicles is traveling and the spacing between the vehicles in the platoon of vehicles.

2. The method of claim 1, wherein the access point further assigns the same uplink or downlink modulation and coding scheme (MCS) level to the leading vehicle and the trailing vehicle based on the platoon information.

3. The method of claim 1, wherein the access point further assigns the same uplink timing advance to the leading vehicle and the trailing vehicle based on the platoon information, the uplink timing advance corresponding to a propagation delay of an uplink signal communicated to the access point.

4. A method for low overhead control signaling, the method comprising:
    receiving, by a trailing vehicle in a platoon of vehicles, a beam direction parameter assigned to the trailing vehicle from an access point prior to communicating any channel information to the access point, the beam direction parameter assigned to the trailing vehicle having been assigned based on a beam direction parameter associated with a leading vehicle in the platoon of vehicles during a first time instance and at least one of a speed in which the platoon of vehicles is traveling and a spacing between the vehicles in the platoon of vehicles, the beam direction parameter assigned to the trailing vehicle including a set of beamforming weights or a spatial direction to be used for an uplink or downlink transmission; and
    transmitting a signal to the access point according to the beam direction parameter assigned to the trailing vehicle during a second time instance.

5. The method of claim 4, wherein the access point further assigns the same downlink modulation and coding scheme (MCS) level assigned by the access point to the leading vehicle and the trailing vehicle based on at least one of the speed of the platoon of vehicles and the spacing between vehicles in the platoon of vehicles.

6. The method of claim 5, further comprising:
    estimating a channel information value based on a downlink reference signal received from the access point;
    comparing a channel information value associated with the assigned MCS parameter with the estimated channel information value; and
    transmitting an uplink feedback message to the access point upon determining that a difference between the channel information value associated with the assigned MCS parameter and the estimated channel information value exceeds a threshold, the uplink feedback message including the estimated channel information value.

7. The method of claim 4, wherein the access point further assigns the same uplink timing advance to the leading vehicle and the trailing vehicle based on at least one of the speed of the platoon of vehicles and the spacing between vehicles in the platoon of vehicles, the uplink timing advance corresponding to a propagation delay of an uplink signal communicated to the access point.

8. The method of claim 4, wherein the trailing vehicle further received a sequence of timing advances from the access point, and wherein transmitting the signal comprises:
    transmitting a first uplink signal to the access point according to a first timing advance in the sequence of timing advances; and
    after expiration of a delay period, transmitting a second uplink signal to the access point according to a second timing advance in the sequence of timing advances.

9. A method for low overhead control signaling, the method comprising:
    receiving, by an access point, channel information and platoon information from a leading vehicle in a platoon of vehicles, wherein the platoon information includes at least one of a speed of the platoon of vehicles and a spacing between vehicles in the platoon of vehicles;
    assigning, by the access point, a first beam direction parameter to the leading vehicle in the platoon of vehicles at a first time instance; and
    assigning, by the access point, a second beam direction parameter to a trailing vehicle in the platoon of vehicles at a second time instance based on the first beam direction parameter and at least one of the spacing between the leading vehicle and the trailing vehicle and the speed of the platoon of vehicles, the first beam direction parameter and the second beam direction parameter including respective sets of beamforming weights or respective spatial directions to be used for uplink or downlink transmissions.

10. The method of claim 9, wherein the access point further assigns a transmit power level to the trailing vehicle based on the platoon information.

11. The method of claim 9, wherein the access point further assigns an uplink timing advance to the trailing vehicle based on the platoon information.

12. An access point comprising:
    a processor; and
    a non-transitory computer readable storage medium storing programming for execution by the processor, the programming including instructions to:
        receive channel information and platoon information from a leading vehicle in a platoon of vehicles, wherein the platoon information includes at least one of a speed of the platoon of vehicles and a spacing between vehicles in the platoon of vehicles; and
        assign a beam direction parameter to a trailing vehicle for use during a second time instance based on a beam direction parameter associated with the leading vehicle during a first time instance and at least one of the spacing between vehicles in the platoon of vehicles and the speed of the platoon of vehicles, the beam direction parameter assigned to the trailing vehicle including a set of beamforming weights or a spatial direction to be used for an uplink or downlink transmission.

13. The access point of claim 12, wherein the access point further assigns a transmit power level to the trailing vehicle based on the platoon information.

14. The access point of claim 12, wherein the access point further assigns an uplink timing advance to the trailing vehicle based on the platoon information.

15. A trailing vehicle in a platoon of vehicles, the trailing vehicle comprising:
a processor; and
a non-transitory computer readable storage medium storing programming for execution by the processor, the programming including instructions to:
receive a beam direction parameter assigned to the trailing vehicle from an access point prior to communicating any channel information to the access point, the beam direction parameter assigned to the trailing vehicle having been assigned based on a beam direction parameter associated with a leading vehicle in the platoon of vehicles during a first time instance and at least one of a speed in which the platoon of vehicles is traveling and a spacing between vehicles in the platoon of vehicles, the beam direction parameter assigned to the trailing vehicle including a set of beamforming weights or a spatial direction to be used for the uplink or downlink transmission; and
transmit a signal to the access point according to the beam direction parameter assigned to the trailing vehicle during a second time instance.

16. The trailing vehicle of claim 15, wherein the access point further assigns the same downlink modulation and coding scheme (MCS) level assigned by the access point to the leading vehicle and the trailing vehicle based on at least one of the speed of the platoon of vehicles and the spacing between vehicles in the platoon of vehicles.

17. The trailing vehicle of claim 16, wherein the programming further includes instructions to:
estimate a channel information value based on a downlink reference signal received from the access point;
compare a channel information value associated with the assigned MCS parameter with the estimated channel information value; and
transmit an uplink feedback message to the access point upon determining that a difference between the channel information value associated with the assigned MCS parameter and the estimated channel information value exceeds a threshold, the uplink feedback message including the estimated channel information value.

18. The trailing vehicle of claim 15, wherein the access point further assigns the same uplink timing advance to the leading vehicle and the trailing vehicle based on at least one of the speed of the platoon of vehicles and the spacing between vehicles in the platoon of vehicles, the uplink timing advance corresponding to a propagation delay between the leading vehicle and the access point.

19. The trailing vehicle of claim 15, wherein the trailing vehicle further received a sequence of timing advances from the access point during the receiving step, and wherein programming further includes instructions to:
transmit a first uplink signal to the access point according to a first timing advance in the sequence of timing advances; and
after expiration of a delay period, transmit a second uplink signal to the access point according to a second timing advance in the sequence of timing advances.

20. An access point comprising: a processor; and
a non-transitory computer readable storage medium storing programming for execution by the processor, the programming including instructions to:
receive channel information and platoon information from a leading vehicle in a platoon of vehicles, wherein the platoon information includes at least one of a speed of the platoon of vehicles and a spacing between vehicles in the platoon of vehicles;
assign a first beam direction parameter to the leading vehicle in the platoon of vehicles at a first time instance; and
assign a second beam direction parameter to a trailing vehicle in the platoon of vehicles at a second time instance based on the first beam direction parameter and at least one of the spacing between vehicles in the platoon of vehicles and the speed of the platoon of vehicles, the first beam direction parameter and the second beam direction parameter including respective sets of beamforming weights or respective spatial directions to be used for uplink or downlink transmissions.

21. The access point of claim 20, wherein the access point further assigns a transmit power level to the trailing vehicle based on the platoon information.

22. The access point of claim 20, wherein the access point further assigns an uplink timing advance to the trailing vehicle based on the platoon information.

* * * * *